(12) United States Patent
Waidmann et al.

(10) Patent No.: US 10,565,489 B2
(45) Date of Patent: Feb. 18, 2020

(54) SPOOLABLE SMALL-FORM-FACTOR RFID-ENABLED WRISTBAND

(71) Applicant: Quake Global, Inc., San Diego, CA (US)

(72) Inventors: Luke Christopher Waidmann, San Diego, CA (US); Tom C. Lorenzana, Spring Valley, CA (US); Enrique Adrian Valdez, Chula Vista, CA (US); Chetan Shantilal Karani, Chantilly, VA (US); Kevin W. Harris, San Diego, CA (US)

(73) Assignee: Quake Global, Inc., San Diego, CA (US)

( * ) Notice: Subject to any disclaimer, the term of this patent is extended or adjusted under 35 U.S.C. 154(b) by 0 days.

(21) Appl. No.: 16/112,423

(22) Filed: Aug. 24, 2018

(65) Prior Publication Data

US 2019/0065926 A1 Feb. 28, 2019

Related U.S. Application Data

(60) Provisional application No. 62/549,910, filed on Aug. 24, 2017.

(51) Int. Cl.
*G06K 19/06* (2006.01)
*G06K 19/077* (2006.01)
*B29D 99/00* (2010.01)
*G06F 21/32* (2013.01)

(52) U.S. Cl.
CPC ... *G06K 19/07762* (2013.01); *B29D 99/0078* (2013.01); *G06F 21/32* (2013.01); *G06K 19/07707* (2013.01)

(58) Field of Classification Search
CPC ..... Y10T 428/15; G09F 3/0288; G09F 3/005; G09F 2003/0269; G06K 19/07749; G06K 19/07798; B65D 2203/10
USPC .............. 283/81, 105; 235/487, 492; 40/674
See application file for complete search history.

(56) References Cited

U.S. PATENT DOCUMENTS 8,061,069 B1 * 11/2011 Joseph ................. G09F 3/005 40/633
2018/0151092 A1 * 5/2018 Becker ..................... G09F 3/10

* cited by examiner

*Primary Examiner* — Jamara A Franklin
(74) *Attorney, Agent, or Firm* — Procopio Cory Hargreaves and Savitch LLP

(57) ABSTRACT

Spoolable RFID-enabled wristbands with maximized read range. In an embodiment, a wristband comprises flexible material formed into a flag portion and a strap portion. The flag portion comprises a radio-frequency identification (RFID) inlay embedded within the material. The strap portion extends from the flag portion, and is perforated in a line along a longitudinal axis of the wristband from a distal end of the strap portion that is distal to the flag portion to a hole at a proximal end of the strap portion that is proximal to the flag portion, such that the strap portion may be torn, from the distal end to the hole at the proximal end, along the perforated line, into two sections of substantially equal dimension, which each extend from the flag portion.

20 Claims, 8 Drawing Sheets

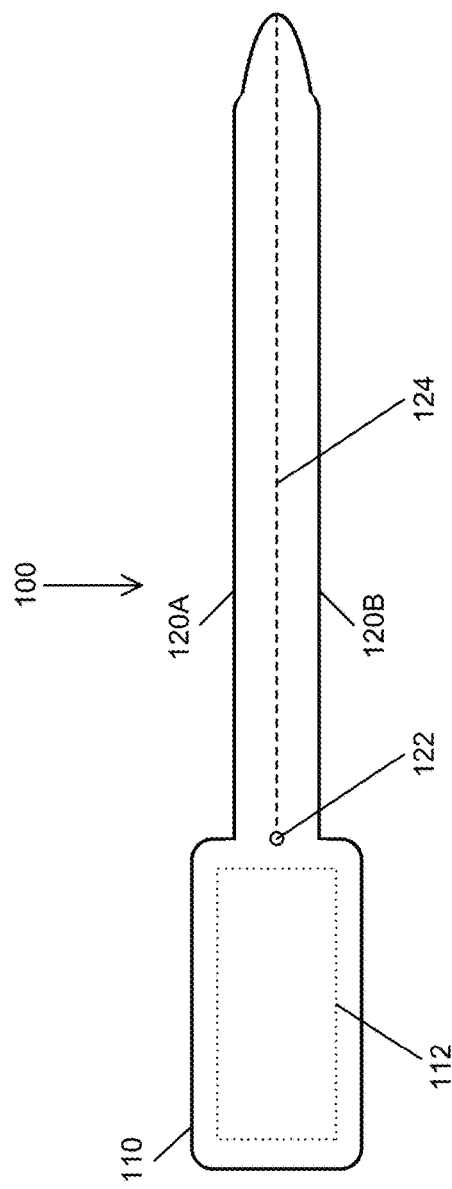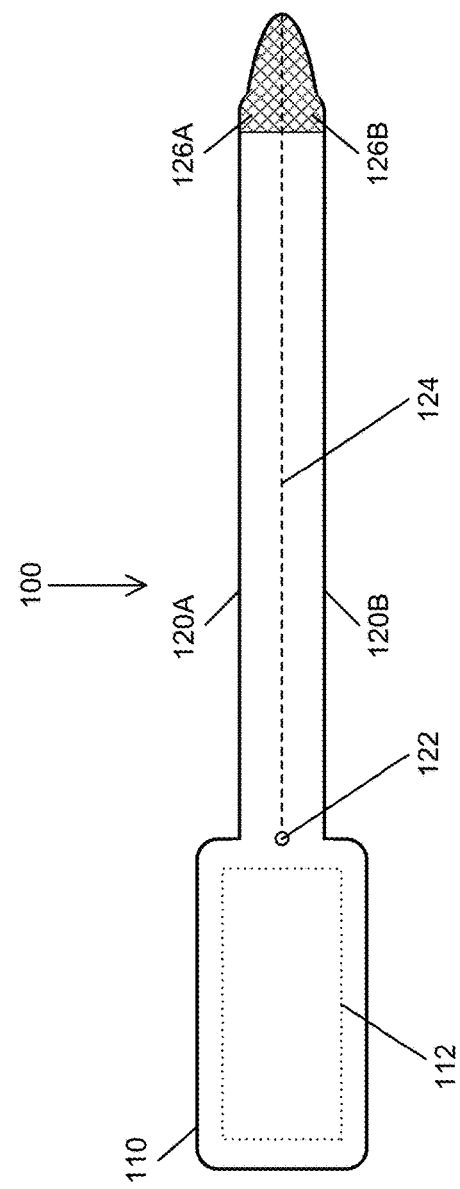

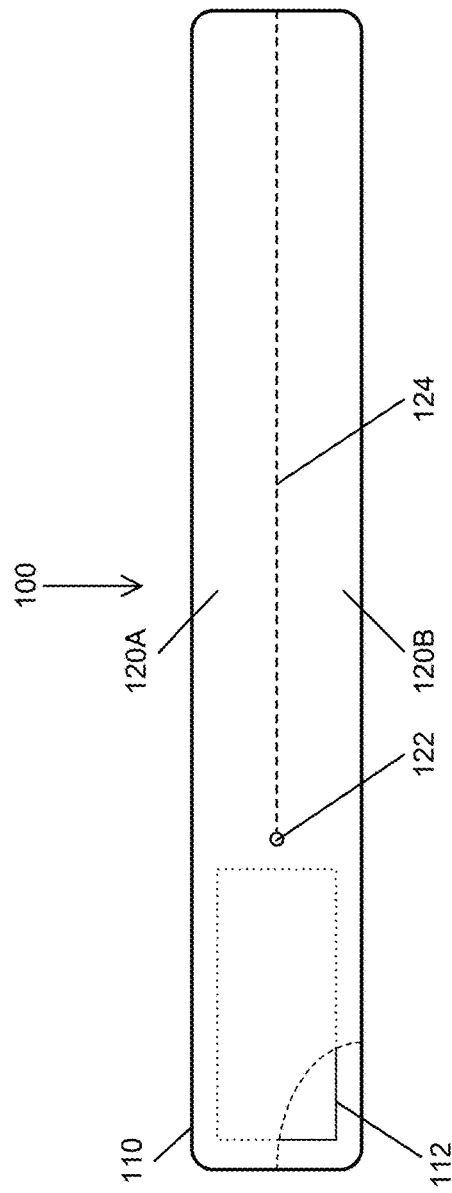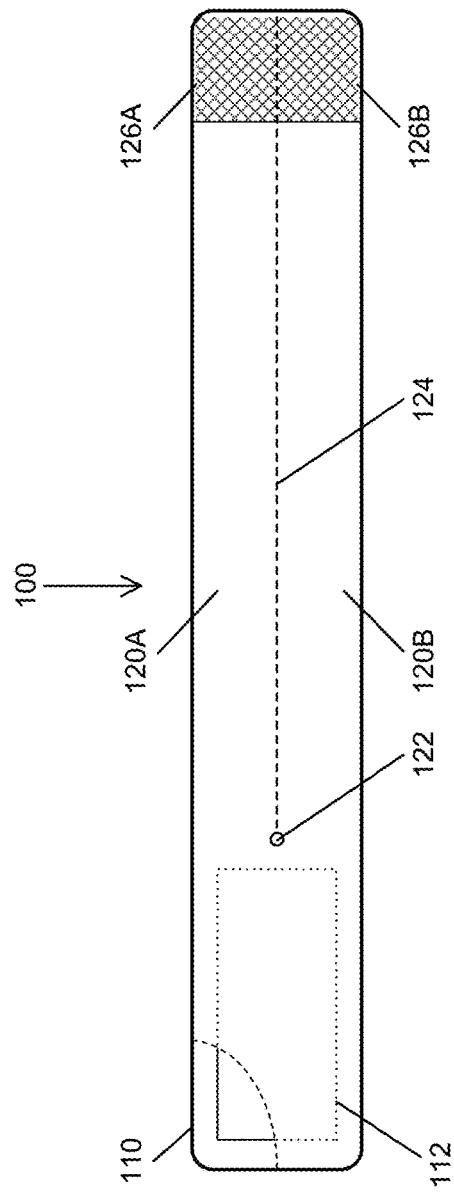

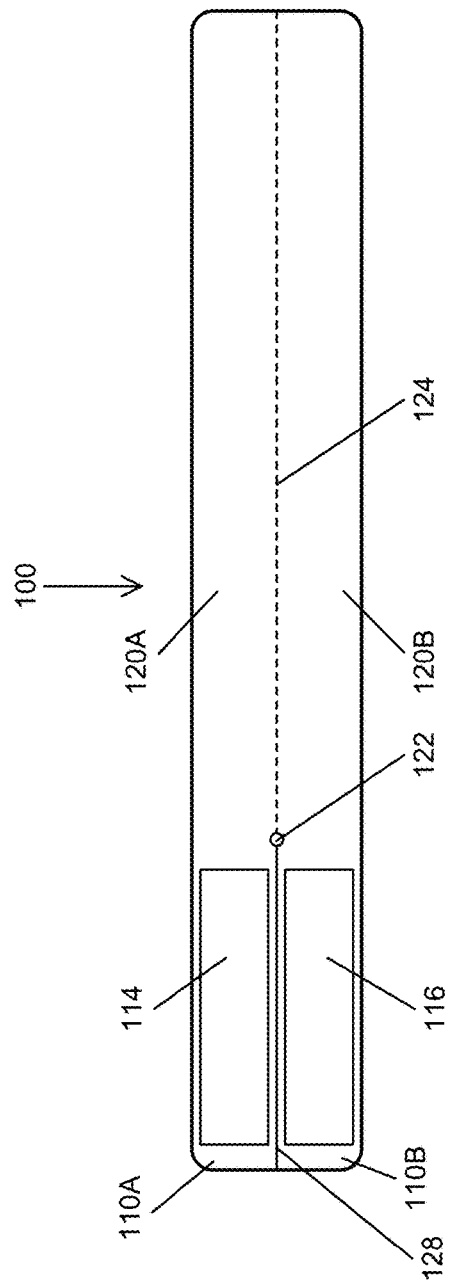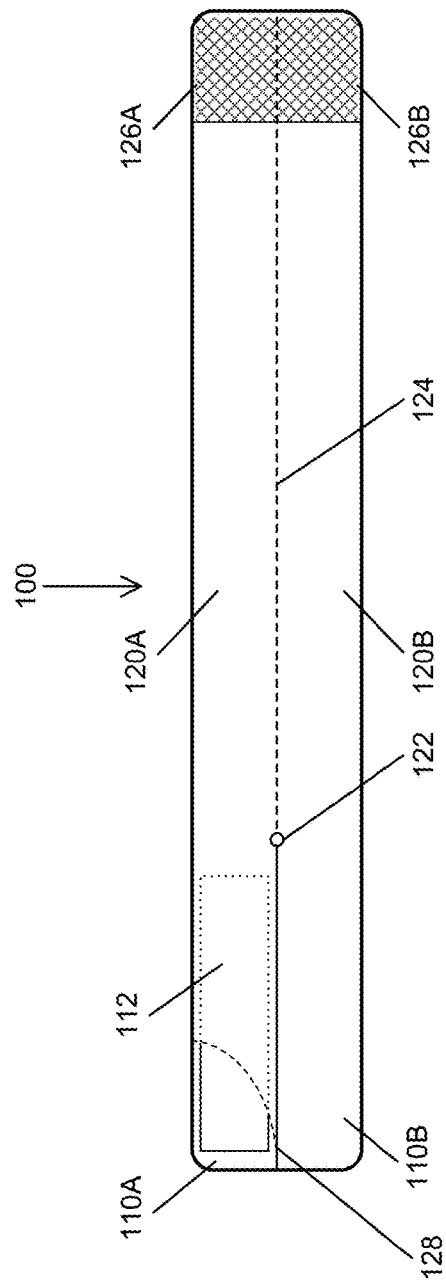

SPOOLABLE SMALL-FORM-FACTOR RFID-ENABLED WRISTBAND

CROSS-REFERENCE TO RELATED APPLICATIONS

This application claims priority to U.S. Provisional Patent App. No. 62/549,910, filed on Aug. 24, 2017—the entirety of which is hereby incorporated herein by reference.

BACKGROUND

Field of the Invention

The embodiments described herein are generally directed to RFID-enabled wristbands, and, more particularly, to RFID-enabled wristbands which are configured to be spoolable for printing and to maximize their read range.

Description of the Related Art

The technique of identifying objects using radio-frequency communications has been eponymously called radio-frequency identification (RFID). RFID systems have been employed in a wide range of applications, such as retail supply chain, postal logistics, healthcare, manufacturing, retail stores, airport baggage tracking, hospitality, social media, travel, theme parks, and the like. In retail supply chain applications, RFID has been used to track and trace goods throughout the supply chain, automate the receipt of pallets of shipments at distribution centers, increase shipping accuracy of goods from distribution centers to stores, and manage inventory throughout the supply chain. In postal logistics, RFID has been used to monitor the quality of service of postal shipments for international and national mail systems. In healthcare, RFID is being used for asset and resource management, as well as patient and staff tracking for improving patient flow within hospitals. In airports—specifically baggage tracking—RFID is being used as a replacement to barcode-based systems for quicker, more secure, and more accurate transfer of bags to improve the overall baggage-handling rate. Accordingly, RFID systems have been employed in a variety of diverse applications to facilitate the identification and tracking of merchandise, personnel, and other items and/or individuals that need to be reliably monitored and/or controlled within a particular environment. The introduction of RFID into these applications has resulted in more secure, efficient, and accurate systems.

A conventional RFID system typically includes at least one RFID transponder or "tag," at least one RFID reader (also referred to as an "interrogator"), and at least one controller or server. The reader typically inventories the tags and forwards the data to the server or controller.

At the physical layer of a passive ultra-high-frequency (UHF) RFID system, RFID tags communicate by "backscattering" signals that are concurrent with reader transmissions, and using a variety of frequencies and encodings under the control of the reader. This is in contrast to earlier high-frequency (HF) tags, based on inductive coupling, that only provided read ranges of centimeters, and active tags that require batteries to increase their read ranges. There is a class of tags called battery-assisted-passive (BAP) that may also be of interest. For some applications, more read range or link margin may be needed than a passive tag. This is especially true in environments with metals and water, in which electromagnetic waves experience shadowing of energy, destructive interference, and/or strong attenuation. More link margin may lead to better reading reliability and better interference control in harsh environments. BAP tags may overcome the read-sensitivity limitation of passive tags by adding a battery to power the chip. The radio-frequency (RF) signal is then used only to carry information, not to supply power to the chip. These tags retain the reverse link of passive tags (i.e., backscattering the response). BAP tags fill the gap between purely passive tags and the more costly (battery-powered) active tags.

Each RFID reader typically follows a predefined sequence or protocol to interrogate and retrieve data from one or more RFID tags within the RF field of the reader (also known as the "interrogation zone" of the reader). It is noted that the interrogation zone of a reader is generally determined by the physical positioning and orientation of the reader relative to the tags, and the setting of various parameters (e.g., the transmit power) employed by the reader during the interrogation sequence.

In systems employing passive tags, the interrogation zone is typically defined by the power coupling zone. For example, a typical interrogation sequence performed by a RFID reader includes transmitting a continuous wave to one or more passive tags within the reader's interrogation zone to power the tags, and transmitting a message packet (e.g., a request or command) by modulating the carrier signal. The passive tag reads the message packet while tapping some of the energy of the continuous wave to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the continuous wave, and reflects a portion of the modulated wave back to the reader by changing the reflection characteristics of its antenna via a technique known as "backscatter modulation."

The physical and logical layers of the communication between the reader and the tag are defined by an air protocol. Specifically, the air protocol defines the signaling layer of the communication link, the reader and tag operating procedures and commands, and the collision arbitration (also known as "singulation") scheme to identify a specific tag in a multiple-tag environment. The EPCGlobal Class-1 Generation 2 (ISO 18000-6c) protocol ("Gen2 protocol") is a world-wide standard air protocol in the UHF band. Embodiments disclosed herein may use—but are not limited to using—the Gen2 protocol for communications between the reader and tags.

The collision arbitration algorithm used in the Gen2 protocol is called the "Q algorithm" and is a variant of the slotted Aloha protocol. At the beginning of a round, the reader broadcasts the round size S to all the tags in its field of view. Each tag, upon receipt of this initial broadcast message, generates a pseudo-random number between 1 and S. This generated number becomes the target time-slot in which the tag responds. The reader is the time-keeper and advances time by sending slot messages to the tags. Each tag decrements its target slot counter, and when its counter hits zero, the tag responds to the reader. The reader listens for a tag response in each slot. If exactly one tag responds, the reader initiates a state machine to transact with the tag. In the case of a collision or an "empty" slot, the reader either decides to resize S and start a new round or proceeds with the current round. This is how a single RFID reader is able to identify multiple tags in a rapid manner. For example, the singulation rate in a dense reader environment is roughly two-hundred tags per second.

The communication protocol used between the reader and the controller or server is called a reader protocol. The EPCGlobal Low Level Reader Protocol (LLRP) is the standard reader protocol that is employed by most conventional readers around the world. Embodiments disclosed herein may use—but are not limited to using—the LLRP protocol for communications between the reader and controller or server.

UHF RFID readers operate in the industrial, scientific, and medical (ISM) band and are prone to external interference from cordless telephones, wireless headsets, wireless data networks, and the like. In addition, there may be interference due to other co-located readers. Each reader's RF receiver front end must be designed to withstand high-interference signal levels without introducing distortion that can cause tag response decoding errors. The receiver noise needs to be low so that it has sufficient dynamic range (transmit power-received signal power from the tag) to allow error-free detection of low-level responding tag signals.

Certain behavior characteristics of electromagnetic fields may dominate at one distance from a radiating antenna, while a completely different behavior may dominate at another distance. At UHF frequencies, tags primarily use electromagnetic coupling in the far field, which means that the readers couple with the tags primarily with propagating electromagnetic energy in the far field (e.g., distance greater than two wavelengths). However, when the tag is in the near field (e.g., distance less than one wavelength) of the reader antenna, coupling occurs using inductive coupling. One may design tags to couple with a reader antenna primarily using inductive coupling, giving rise to UHF near-field tags. Embodiments disclosed herein may use—but are not limiting to using—UHF far-field tags.

Conventional tag designs are typically passive RFID tags, meant for general-purpose supply-chain use cases, specifically designed for free space. The performance of such tags may degrade when placed near high dielectrics such as water (e.g., with a dielectric constant of eighty). This loss of performance may result because the close proximity to high dielectric material causes a substantial shift in resonant frequency of the antenna, causing it to not operate at a resonant mode. This results in a loss of antenna efficiency and also causes a shift in antenna impedance which may negatively impact power-transfer efficiency.

The human body is 60% water. Thus, when a tag that is optimized for free space is applied to the human body, the read distances may be severely impacted. For instance, a tag that reads close to six meters in free space may not be readable at distances more than half a meter when applied to the human body. Such degraded performance is typically unacceptable for a UHF-RFID-based people-tracking solution at an enterprise scale. This performance is basically equivalent to a proximity HF-based solution which is typically suitable for door-access type applications, but not for general-purpose people-tracking in indoor environments (e.g., within buildings) or outdoor environments (e.g., in theme parks, ski areas, etc.). One people-tracking application in indoor environments is tracking patients in hospitals. Patient-tracking typically requires RFID tags to be in a wristband form-factor. An example people-tracking application in outdoor environments is tracking skiers at a ski resort. The wristband may serve as an access pass or ticket for entry into the ski resort and/or for utilizing or accessing the ski lift or other services available at the resort, so that skiers do not have to remove their gloves in order to present the pass or ticket at an access point.

Conventional wristbands for patient identification are typically either barcode-based or HF-tag-based. Both of these technologies may allow for proximity and line-of-sight based reading. However, such limitations may not allow for patient-tracking across a hospital. As mentioned above, wristband designs based on UHF passive tags may have severely degraded performance when applied to a patient's wrist.

On the other end of the spectrum, there are wristband designs based on active tags. However, wristbands built using active tags are typically bulky. They also may be very expensive (e.g., at least ten times that of UHF tag based solutions). Due to their high cost, customers conventionally reuse these wristbands. This may introduce a new workflow for the customer to manage with respect to safety, cleanliness, identity management, and/or battery life management.

Thus, what is needed is a small form-factor wristband that maximizes read range, but is also suitable for high-usage applications. For instance, the wristband should be spoolable, so that subject-specific wristbands may be printed quickly and efficiently for large numbers of subjects (e.g., for a subject-tracking application).

SUMMARY

Accordingly, in an embodiment, an RFID-enabled wristband with a small form-factor is disclosed, which is spoolable and provides long read ranges.

In an embodiment, a wristband is disclosed that comprises flexible material formed into: a flag portion that comprises a radio-frequency identification (RFID) inlay embedded within the material; and a strap portion extending from the flag portion, wherein the strap portion is perforated in a line along a longitudinal axis of the wristband from a distal end of the strap portion that is distal to the flag portion to a hole at a proximal end of the strap portion that is proximal to the flag portion, such that the strap portion may be torn, from the distal end to the hole at the proximal end, along the perforated line, into two sections of substantially equal dimension, which each extend from the flag portion.

In an embodiment, a spool of wristbands is disclosed. The spool comprises: a plurality of wristbands wound around a cylindrical core, wherein each wristband comprises flexible material formed into a flag portion that comprises a radio-frequency identification (RFID) inlay embedded within the material, and a strap portion extending from the flag portion, wherein the strap portion is perforated in a line along a longitudinal axis of the wristband from a distal end of the strap portion that is distal to the flag portion to a hole at a proximal end of the strap portion that is proximal to the flag portion, such that the strap portion may be torn, from the distal end to the hole at the proximal end along the longitudinal perforated line, into two sections of substantially equal dimension, which each extend from the flag portion, wherein each of the plurality of wristbands is joined to at least one adjacent wristband by the material, and wherein the material is perforated, in a line along a lateral axis that is perpendicular to the longitudinal axis, at a boundary between each adjacent wristband, such that each wristband may be torn from each adjacent wristband along the lateral perforated line at the boundary between each wristband and each adjacent wristband.

In an embodiment, a method of manufacturing a spool of wristbands is disclosed. The method comprises: embedding an RFID inlay within a material at a plurality of fixed spatial intervals; perforating the material in a longitudinal line, along a longitudinal axis of the material, at a plurality of fixed spatial intervals, to define two separable sections of substantially equal dimension; punching a hole in the material at one end of each longitudinal line; perforating the material in a lateral line, along a lateral axis of the material that is perpendicular to the longitudinal axis, at a plurality of fixed spatial intervals, to define separable boundaries between the wristbands; and spooling the material around a cylindrical core.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 1A and 1B illustrate opposite sides of a wristband, according to a first embodiment;

FIGS. 2A and 2B illustrate opposite sides of a wristband, according to a second embodiment;

FIGS. 3A and 3B illustrate opposite sides of a wristband, according to a third embodiment;

DETAILED DESCRIPTION

Figure 1C:
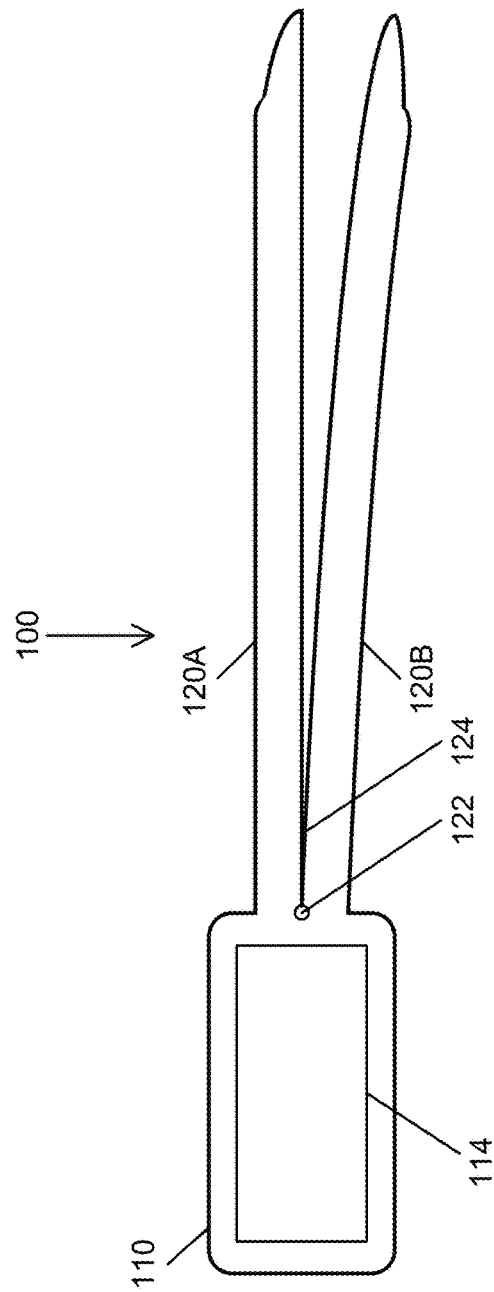
FIGS. 1C and 1D illustrate an example usage of the wristband, according to an embodiment.

In an embodiment, an RFID-enabled wristband with a small form-factor is disclosed. Preferably the wristband is configured to be spooled and enable long-range reads by an RFID reader. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Wristbands

For the sake of understanding, three different embodiments of an RFID-enabled wristband will be disclosed. However, it should be understood that other embodiments are contemplated by the present disclosure. Furthermore, any feature described with respect to one embodiment may be applied to any other embodiment. Thus, the disclosed embodiments should not be considered as distinct, exclusive, or limiting, but rather practical examples of how each of the features described herein may be applied to an RFID-enabled wristband.

While the RFID-enabled wristband will be primarily described as a wristband to be worn on a human's wrist, it should be understood that the embodiments disclosed herein are not limited to this application. Rather, the disclosed RFID-enabled wristband may be affixed to any body part (e.g., wrist, ankle, etc.) of any subject (e.g., human, animal, etc.), as well as any other object (e.g., the handle of a bag or product) that is capable of fitting within the diameter of the RFID-enabled wristband. Thus, while the term "wristband" will be used, it should be understood that the disclosed embodiments are not limited to being worn on the wrist.

1.1. First Embodiment

FIGS. 1A and 1B illustrate opposite sides of an RFID-enabled wristband 100, according to a first embodiment. As illustrated, wristband 100 comprises a flag portion 110 and a strap portion 120.

Flag portion 110 comprises an RFID inlay 112. RFID inlay 112 may comprise a material with high elasticity (e.g., polymers such as polypropylene, polyester, silicon, vinyl, Teflon™, Teslin™, the same material as used to form wristband 100, etc.) and an RFID tag (e.g., RFID tag 400, illustrated in FIG. 4) that is embedded within the high-elasticity material. Advantageously, the high elasticity of the embedding material can eliminate or minimize the curling effect that may result from feeding a spool of wristbands 100 through a printer, which may utilize thermal or transfer printing. In the illustrated embodiment, flag portion 110 comprises at least two layers of material with RFID inlay 112 sandwiched between those two layers. Alternatively, RFID inlay 112 may be adhered to one side of flag portion 110, or otherwise attached to or embedded within flag portion 110.

As illustrated, strap portion 120 is divided into two sections 120A and 120B by a slit 124, which extends from the distal end of strap portion 120 that is opposite to flag portion 110 to a hole 122 that is proximal to flag portion 110. In the illustrated embodiment, slit 124 extends substantially the entire length of strap portion 120, with hole 122 positioned at, on, or near flag portion 110.

In an embodiment, sections 120A and 120B each comprise an adhesive 126A and 126B, respectively, at their distal ends (i.e., the end that is opposite flag portion 110 on wristband 100). Each of adhesives 126A and 126B may comprise a patch of double-sided tape, with one side adhered to the distal end of strap portion 120, and the other side initially covered by a removable material (e.g., a peel-able paper backing) so as to prevent sticking or loss of adhesive before usage. Alternatively, adhesives 126 could be replaced with another means of fixing the distal ends of sections 120A and 120B to each other, such as a buckle on one of sections 120A or 120B and one or more holes (e.g., a plurality of holes, for example, representing different wrist sizes), configured to receive the buckle, on the other one of sections 120A and 120B. As another alternative, adhesives 126 could be replaced with a slot in one of sections 120A and 120B and a component which fixedly fits into the slot on the other one of sections 120A and 120B. In any case, any fixation mechanism should be capable—in at least an initial spooled configuration—of being fed through a printer (e.g., which utilizes thermal or transfer printing) without jamming the printer and without losing its ability to fix sections 120A and 120B to each other. In addition, the fixation mechanism may be tamper-proof or tamper-resistant. For example, the adhesives may be designed to only stick once, such that, if someone attempts to remove a wristband 100 after being worn, the adhesives cannot be re-adhered, and therefore, the wristband 100 cannot be worn a second time or by someone else. Similarly, if a hole or slot is used, the buckle or other component may be configured to, once fitted within the hole or slot, not be easily removed from the hole or slot (e.g., without tearing the hole, slot, buckle, or other component of wristband 100).

Initially, slit 124 may comprise a line of perforated material which join sections 120A and 120B together. As illustrated in FIG. 1C, according to an embodiment, a user may split sections 120A and 120B by tearing or cutting the line of perforations from its distal end to hole 122 at its proximal end, to thereby separate sections 120A and 120B from each other. Hole 122 may be a punched hole at the proximal end of slit 124 that is mathematically sized based on the dimensions of flag portion 110, the size and/or type of RFID inlay 112, and/or the properties of the material(s) used for wristband 100.

Figure 1D:
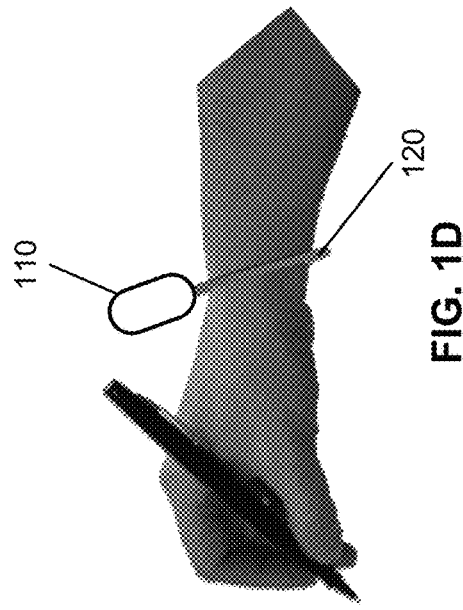

After sections 120A and 120B have been split along slit 124, as illustrated in FIG. 1C, section 120A may be wrapped around one side of a user's wrist, while section 120B is wrapped around the other side of the user's wrist. As illustrated in FIG. 1D, according to an embodiment, the distal ends of sections 120A and 120B may then be joined around the user's wrist by adhesives 126 (or other fixation mechanism). For example, the paper backing may be removed from adhesives 126A and 126B and the exposed side of adhesive 126A may be adhered to any position on section 120B, while the exposed side of adhesive 126B may be adhered to any position on section 120A. It should be understood that, in this manner, the diameter of strap portion 120 can be appropriately sized for a specific user's wrist. For example, to achieve a maximum diameter, adhesive 126A may be joined directly to adhesive 126B. Conversely, to achieve a minimum diameter, adhesive 126A may be adhered to a proximal end of section 120B, and adhesive 126B may be adhered to a proximal end of section 120A. The length of strap portion 120 can be chosen so as to provide a range of possible diameters that is appropriate to the subject to which wristband 100 will be attached.

Advantageously, wristbands 100 are designed to use a short repeat, to maximize the number of wristbands 100 that can fit on a spool. Specifically, the ability to split strap portion 120 down the middle by tearing slit 124 and then adhering resulting strap portions 120A and 120B to each other, enables the spooled length of wristband 100 to be minimized. Essentially, strap portion 120 is half the length than in a conventional spool of wristbands, in which straps are not obtained by splitting a strap portion in half down a middle line. Accordingly, the disclosed configuration, with integrated slit 124, maximizes the number of wristbands 100 that can fit on a single spool of wristbands. This minimizes the time spent replacing spools, which can be especially important in medical or other high-usage applications. It can also be especially useful for small-format mobile label printers, for which large spools of wristbands would be cumbersome.

In an embodiment, flag portion 110 may comprise an external printable region 114 on which text (e.g., subject's name, patient information, etc.), images (e.g., logo, photograph of subject, etc.), or other graphics (e.g., a bar code, Quick Response (QR) code, etc.) can be printed. Flag portion 110 may comprise a printable region 114 on the external surface of one or both of its sides.

Advantageously, hole 122 provides strain relief and ensures that flag portion 110 is always substantially perpendicular to the object to which wristband 100 is attached. Thus, as illustrated in FIG. 1D, flag portion 110, with RFID inlay 112, is always visible and unobstructed and positioned off of the user's body in a "flagged" position. Not only does this ensure that any information printed on printable region 114 is visible, but it also ensures that the RF path to and from RFID inlay 112 is unobstructed, thereby maximizing RF read range and performance. The strain relief—in addition to the high elasticity of the material used in wristband 100—also eliminates or minimizes the curling effect caused by spool printing, thereby ensuring an even energy distribution across the plane of RFID inlay 112, resulting in robust RF performance. In addition, the strain relief protects the material of wristband 100 and RFID inlay 112 from ripping.

1.2. Second Embodiment

FIGS. 2A and 2B illustrate opposite sides of an RFID-enabled wristband 100, according to a second embodiment. The second embodiment differs from the first embodiment only in the profile of strap portion 120. The second embodiment may have the same flag portion 110, embedded RFID inlay 112, printable region(s) 114, hole 122, slit 124, and adhesives 126 or other fixture means as described above with respect to the first embodiment, and attach to a subject in the same manner as described above with respect to the first embodiment (e.g., by being split down slit 124 and fixing sections 120A and 120B to each other around a user's wrist). Advantageously, however, the lateral width of strap portion 120 matches the lateral width of flag portion 110, such that the width of wristband 100 is substantially uniform along its entire longitudinal axis. This may simplify the manufacturing and/or printing process.

Unlike FIGS. 1A and 1B, FIGS. 2A and 2B provide a cut-away view of RFID inlay 112, sandwiched between layers of the material forming wristband 100. It should be understood that the cut-away is not an actual feature of the wristband 100, but is merely used to illustrate how RFID inlay 112 is embedded within flag portion 110.

Figure 2C:
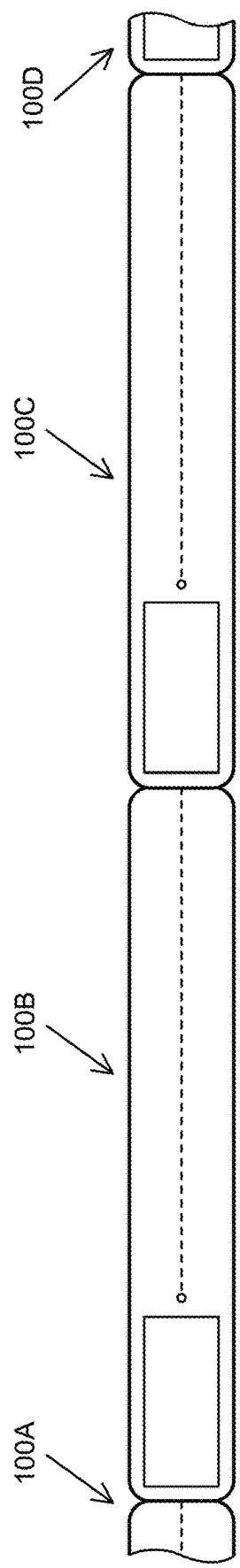
FIGS. 2C and 2D illustrate opposite sides of a spool of wristbands, according to the second embodiment.
Figure 2D:
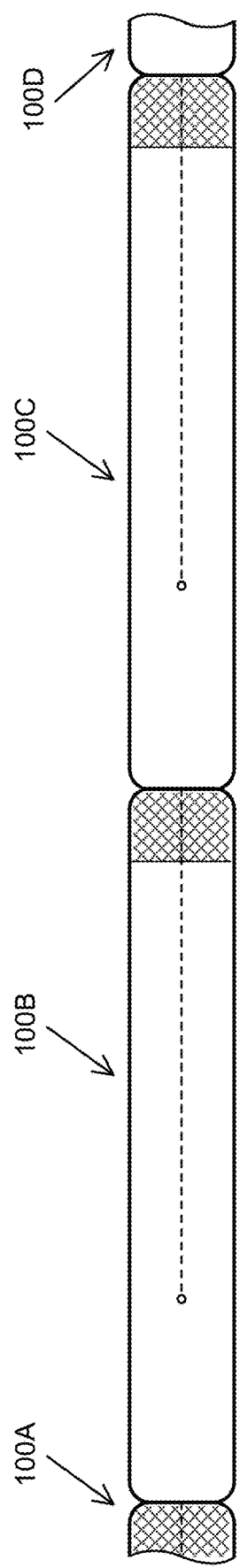

FIGS. 2C and 2D illustrate opposite sides of an unrolled section of a spool of wristbands 100 of the second embodiment, according to an embodiment. As illustrated, a plurality of wristbands 100A-100D are joined together to form one continuous roll. The boundaries between wristbands 100 (e.g., the boundary between wristbands 100B and 100C) may comprise a line of perforations (e.g., similar to slit 124). Thus, the spool of wristbands 100 may be continuously fed through a printer, which configures RFID inlays 112 and/or prints subject-specific information for a different one of a plurality of subjects on printable area 114 of each wristband 100. In this manner, a large number of wristbands 100 can be rapidly and continuously printed without manual intervention. After printing, each wristband 100 may then be separated from the spool by tearing or cutting along the lateral line of perforations representing the boundary between each adjacent pair of wristbands 100.

1.3. Third Embodiment

FIGS. 3A and 3B illustrate opposite sides of an RFID-enabled wristband 100, according to a third embodiment. The third embodiment differs from the second embodiment only in the presence of fold line 128 and dual regions 114 and 116. The second embodiment may have the same flag portion 110, embedded RFID inlay 112, printable region(s) 114, hole 122, slit 124, and adhesives 126 or other fixture means as described above with respect to the first and second embodiments, the same profile and strap portion 120 as described above with respect to the second embodiment, and attach to a subject in the same manner as described above with respect to the first and second embodiments.

Longitudinal fold line 128 may be formed by scoring, thinning, or otherwise weakening the material along the longitudinal axis of wristband 100, to bias flag portion 110 to be folded in one or both lateral directions around the longitudinal axis. Advantageously, this enables dual-sided printing by printing on only a single side of the spool of wristbands 100. Specifically, as the spool of wristbands 100 is fed through the printer, the printer may simultaneously print on both regions 114 and 116, since both regions 114 and 116 are on the same side of each spooled wristband 100. After printing, each wristband 100 may be separated from the spool by tearing or cutting along the line of perforations between each adjacent pair of wristbands 100 (e.g., in the same manner as in the second embodiment). Then, each wristband 100 may be folded along fold line 128, before or after splitting slit 124, such that regions 114 and 116 are both exposed and visible. In other words, referring to FIG. 3B, the surfaces of sections 110A and 110B of flag portion 110 are folded together along fold line 128, such that the opposing surfaces of sections 110A and 110B, illustrated in FIG. 3A, are exposed outward. Accordingly, both regions 114 and 116 are visible, for example, when worn on a subject's wrist (e.g., similar to the illustration in FIG. 1D, but with only half the profile of flag portion 110). Thus, each wristband 100 only needs to pass through the printer once, and is then folded along fold line 128 to provide information on both sides of folded flag portion 110.

Region 116 may be the same as printable region 114. In other words, region 116 may also be a printable region 114. Alternatively, region 116 may be different than printable region 114. For example, region 116 may comprise a display and/or integrated fingerprint sensor, such that, after flag portion 110 has been folded along fold line 128, human-readable information is visible in printable region 114 on one side of flag portion 110 and the display and/or fingerprint sensor is visible and available on the other side of flag portion 110. The display and/or fingerprint sensor may be attached to an external surface of flag portion 110 (e.g., via adhesive) or embedded within the material of flag portion 110 in any well-known manner.

The display may comprise a light-emitting diode (LED) display, liquid crystal display (LCD), and/or the like, and may display information relevant to the subject. In an embodiment, the display may indicate the result of authentication via the integrated fingerprint sensor via color coding. For example, the display may turn green if authentication was successful and red if authentication was unsuccessful. Alternatively, the information may indicate a measure of a particular characteristic of the subject or environment (e.g., temperature, glucose level, etc.). For example, the color of the display may be green when the measure is normal, yellow when the measure passes a first threshold indicating that attention is warranted, and red when the measure passes a second threshold indicating that immediate attention is required. Alternatively or additionally, the display may be capable of dynamically displaying other subject-specific or general information, beyond simple colors, such as allergy information, alerts, the name of a mother and child (e.g., for association between a mother and newborn), and/or the like.

In an embodiment, the fingerprint sensor is used for authentication and/or to validate that the person wearing the wristband 100 is who they present themselves to be. The fingerprint sensor can also be used for automatic association of one person to another person, thereby minimizing the need for manual association. For example, in the healthcare setting, a nurse could scan his or her fingerprint on a patient's wristband to specify that the nurse has administered a test to this patient. This association between the patient and the nurse can be stored in the wristband 100 and/or wirelessly relayed to an external system via RFID inlay 112.

As illustrated in FIG. 3B, RFID inlay 112 is embedded within section 110A which comprises printable region 114. Alternatively, RFID inlay 112 could be embedded within section 110B which comprises region 116. As another alternative, a single RFID inlay 112 could be embedded across both sections 110A and 110B and foldable along fold line 128. As yet another alternative, a first RFID inlay 112 may be embedded in section 110A and a second, distinct RFID inlay 112 may be embedded in section 110B, and both RFID inlays 112 may transmit the same or different information (e.g., the same or different tag identifiers). It should also be understood that, in any of these alternative embodiments, regions 114 and 116 may be interchanged, such that region 114 is on section 110A and region 116 is on section 110B.

Figure 3C:
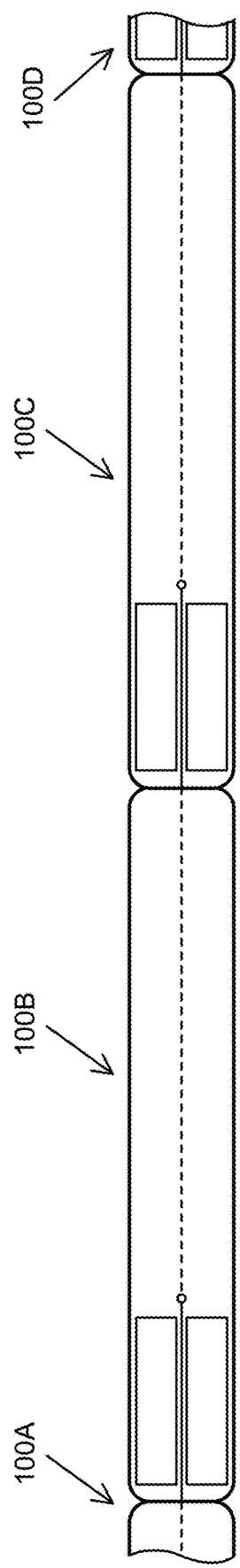
FIGS. 3C and 3D illustrate opposite sides of a spool of wristbands, according to the third embodiment.
Figure 3D:
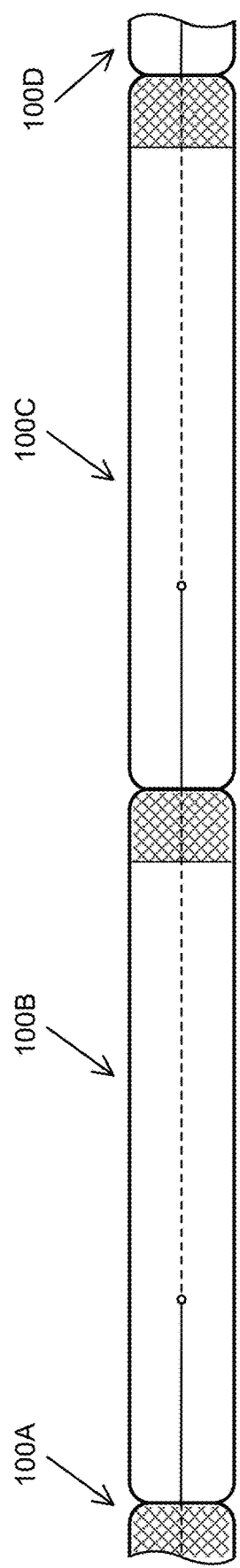

FIGS. 3C and 3D illustrate opposite sides of an unrolled section of a spool of wristbands 100 of the third embodiment, according to an embodiment. The unrolled spool section may be the same as the unrolled spool section of the second embodiment, except for fold line 128 and dual regions 114 and 116.

2. Example RFID Tag

Figure 4:
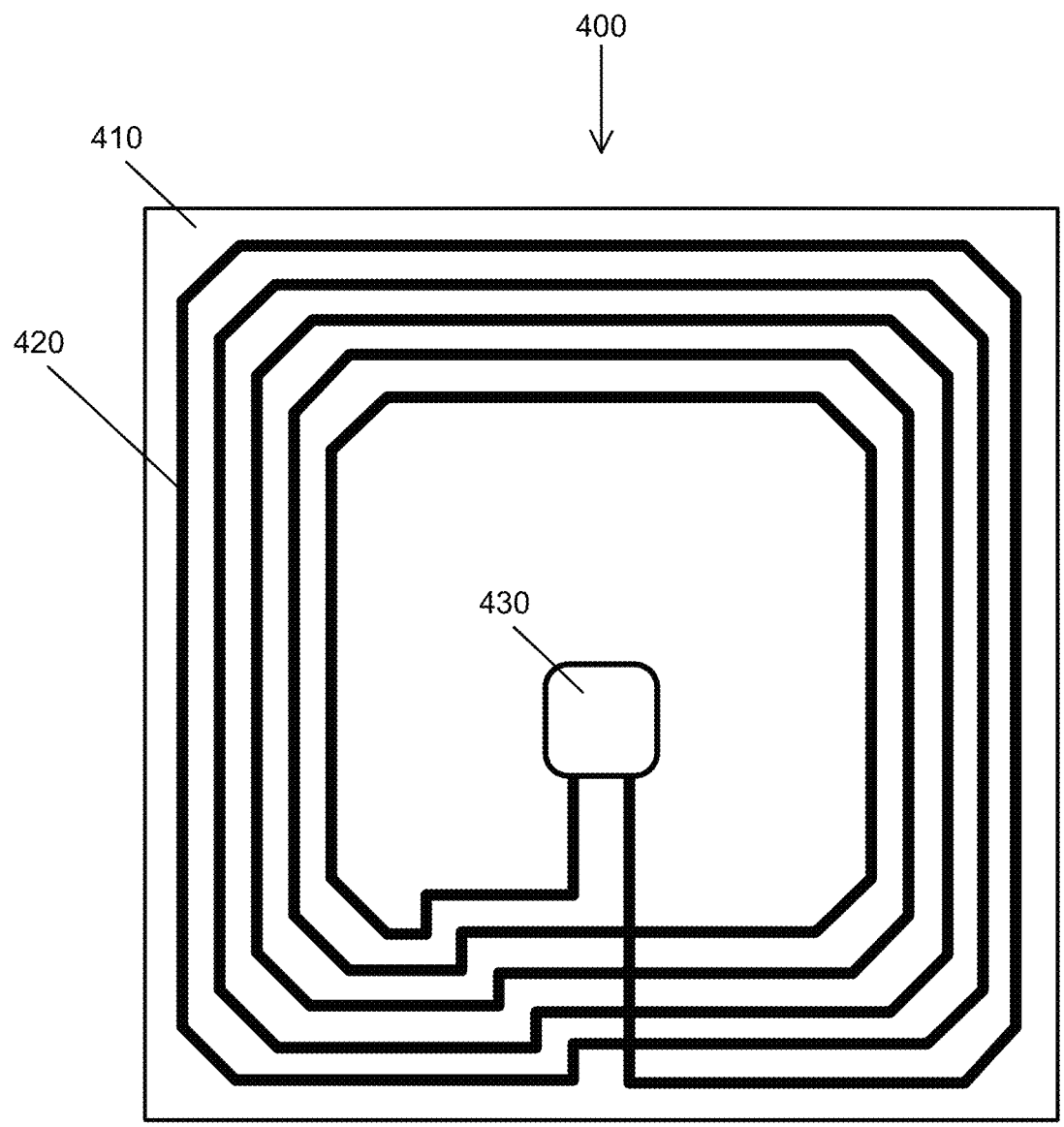
FIG. 4 illustrates an example RFID tag, according to an embodiment.

FIG. 4 illustrates an example RFID tag 400, according to an embodiment. RFID tag 400 may comprise any suitable commercial off-the-shelf RFID tag. Typically, an RFID tag will comprise a substrate 410, an antenna 420, and an RFID chip 430. RFID inlay 112, described elsewhere herein, may consist of RFID tag 400, or comprise RFID tag 400 in combination with other materials and/or components. In an embodiment, since the spooled wristbands 100 represent a high-volume consumable, the materials (e.g., conductive inks) used for substrate 410, antenna 420, and/or RFID chip 430, as well as the materials used generally for each wristband 100, should be biodegradable and/or recyclable.

For passive RFID tags, substrate 410 is typically made from a flexible material with a thickness of 100 to 200 millimeters. Examples of such materials include, without limitation, polymer, polyvinyl chloride (PVC), polyethylenetherephtalate (PET), phenolics, polyesters, styrene, paper, and the like. Alternatively, a rigid material may be used for substrate 410.

Antenna 420 is generally deposited or printed on substrate 410 (e.g., as conductive ink). Antenna 420 receives signals from the reader and either transmits or reflects the received signal back to the reader, as discussed elsewhere herein. While illustrated as a spiral, the geometry and length of antenna 420 will be determined by the frequency at which RFID tag 400 operates. Antenna 420 generally comprises aluminum, copper, silver, or other low-cost materials.

For passive RFID tags, antenna 420 collects power from the RF waves transmitted by the reader and supplies the collected power to RFID chip 430. RFID chip 430 is typically an integrated circuit (IC) that performs the logic necessary to implement the function(s) of RFID tag 400 (e.g., transmitting a tag identifier). RFID chip 430 may comprise a small microprocessor configured to execute instructions stored in a small on-board memory.

3. Method of Manufacture

Figure 5:
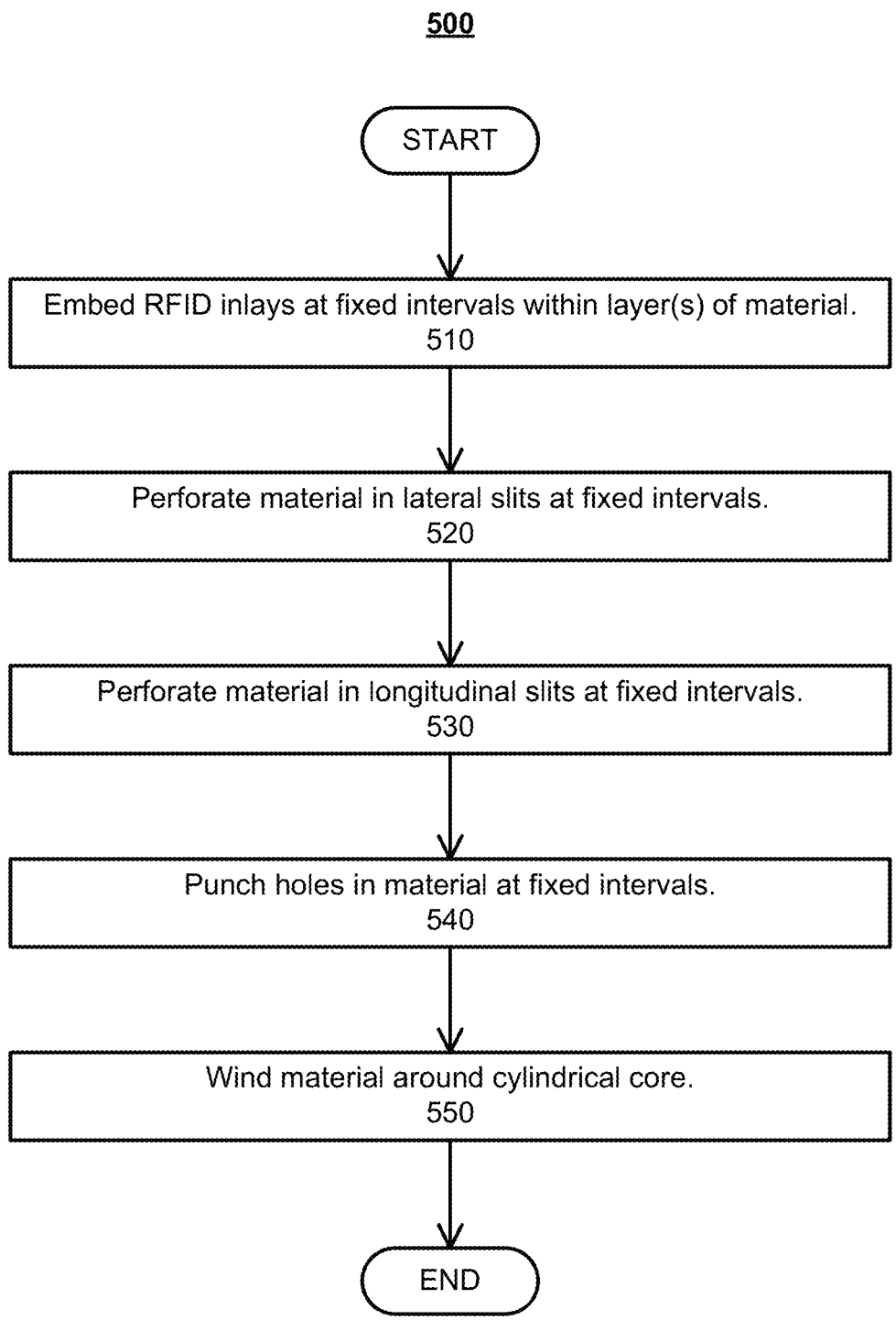
FIG. 5 illustrates a process of manufacturing a spool of wristbands, according to an embodiment.

FIG. 5 illustrates a process 500 for manufacturing a spool of wristbands 100, according to an embodiment. While process 500 is illustrated with a certain arrangement of steps, process 500 may be implemented with fewer, more, or different steps and a different arrangement or ordering of steps.

In step 510, a plurality of RFID inlays 112 are embedded at fixed intervals within a material. For example, an RFID inlay 112 may be placed at fixed spatial intervals on a first layer of the material. Each spatial interval may correspond to the desired length of each wristband 100. A second layer of the material may be placed over the first layer to cover one or more previously placed RFID inlays 112. The first layer and second layer may then be fused to each other around the previously placed RFID inlays 112, using any well-known means, to thereby fix and seal RFID inlays 112 within the two layers of material.

In an embodiment, the material is highly elastic, such that it can regain its original shape and planar structure even after being exposed to high radial stress. In addition, the material should have a dielectric constant of four or less. Examples of suitable materials include, without limitation, polymers (e.g., polypropylene), polyester, silicon, vinyl, Teflon™, Teslin™, and the like. The material may also be infused with antimicrobial and/or hypoallergenic additives (e.g., silver nanoparticles (AgNP), BioCote™, Microban™, etc.) for use with human and/or animal subjects, and may be non-absorbent. Furthermore, in an embodiment, the material is capable of being printed upon (e.g., via direct thermal transfer), or is overlaid or otherwise combined with another material (e.g., paper or other material forming printable regions 114 at fixed intervals) that is capable of being printed upon.

In an embodiment, RFID inlays 112 are high-performance inlays tuned to the human body. For example, RFID inlays 112 may be commercial off-the-shelf RFID inlays whose antennas are designed to work in close proximity to a surface with a certain expected dielectric constant. As an example, the dielectric constant of the human body can be crudely modeled as a body of water. Electromagnetic waves in the human body can result in slower propagation delay in a nearby antenna, which can, in turn, result in a frequency shift in the antenna. Thus, the antenna design of the RFID inlays 112 can attempt to compensate for the particular frequency shift that results from proximity to a human body. Additionally or alternatively, RFID tag 400 may be designed with an inductive component (e.g., as shown in RFID tag 400, illustrated in FIG. 4), which utilizes the magnetic portion of electromagnetic waves and is considerably less affected by the dielectric constant of the human body.

In step 520, the material is perforated in lateral slits, across substantially its entire lateral width, at fixed intervals. Again, the fixed intervals may correspond to the desired length of each wristband 100. In this case, the lateral slits represent the boundaries between adjacent wristbands 100, and allow each wristband 100 to be torn from its adjacent wristband(s) 100.

In step 530, the material is perforated in longitudinal slits 124 of a fixed dimension at fixed intervals. Again, the fixed intervals may correspond to the desired length of each wristband 100. As discussed elsewhere herein, longitudinal slits 124 enable sections 120A and 120B of each strap portion 120 to be at least partially separated from each other.

In steps 520 and 530, the material may be perforated (e.g., from one side of the material to the other side of the material, and through all layers of the material in embodiments which utilize two or more layers) using a mechanical or laser-based perforation process or by other well-known means. The size of the perforations (e.g., diameters of perforations, number of perforations, spacing between perforations, etc.) may be selected according to the desired ease with which the perforations are to be torn. Generally, the size of the perforations should be small enough such that the material does not tear along the perforations while being fed through a printer, but large enough that the material may be torn along the perforations by hand.

In step 540, the material may be punched with holes 122 of a fixed dimension at fixed intervals. As mentioned elsewhere herein, the dimension of holes 122 can be determined based on the dimensions of flag portion 110, the size and/or type of RFID inlay 112, and/or the properties of the material(s) used for wristband 100.

In step 550, the material is wound around a cylindrical core to create a spool of wristbands 100. The cylindrical core may be cardboard or any other suitable material, and may be sized in length and/or diameter depending on the printer with which the spool is to be used. Alternatively, instead of being spooled, the material may be stacked into cassettes to be used with printers which utilize a cassette feed, and/or formed into sheets (e.g., a plurality of wristbands 100 connected by perforated boundaries in a two-dimensional grid) for printers which utilize sheets. The dimensions of the cassettes and/or sheets can be determined based on the printer with which they are to be used.

In any case, the pre-assembled spool, cassette, or stack of wristbands 100 can be fed into an RFID-enabled label printer (e.g., manufactured by Zebra™, Intermec™, Sato™, Lexmark™, HP™, etc.), which both encodes RFID inlays 112 (e.g., specifies and programs the tag identifier) and prints visual information (e.g., text, images, barcodes, QR codes, etc.) to printable regions 114 and/or regions 116. In some cases, the printer may provide an application programming interface (API), which allows third-party software to control the printer (e.g., to specify how to encode RFID inlays 112 and the visual information to be printed, and/or initiate printing).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A wristband comprising flexible material formed into:
a flag portion that comprises a radio-frequency identification (RFID) inlay embedded within the material; and
a strap portion extending from the flag portion, wherein the strap portion is perforated in a line along a longitudinal axis of the wristband from a distal end of the strap portion that is distal to the flag portion to a hole at a proximal end of the strap portion that is proximal to the flag portion, such that the strap portion may be torn, from the distal end to the hole at the proximal end, along the perforated line, into two sections of equal dimension, which each extend from the flag portion.

2. The wristband of claim 1, wherein a lateral width of the strap portion is less than a lateral width of the flag portion.

3. The wristband of claim 1, wherein a lateral width of the strap portion is the same as a lateral width of the flag portion, such that the wristband has substantially uniform width.

4. The wristband of claim 1, wherein the two sections of the strap portion are configured to attach to each other after the strap portion has been torn along the perforated line.

5. The wristband of claim 4, wherein the two sections of the strap portion form a loop when they are attached to each other.

6. The wristband of claim 5, wherein the two sections of the strap portion are attachable at a plurality of positions, such that they may form a loop having any diameter within a range of diameters.

7. The wristband of claim 4, wherein the two sections of the strap portion consist of a first section and a second section, and wherein the distal end of the first section comprises a fixation mechanism which is attachable to at least a portion of the second section.

8. The wristband of claim 7, wherein the fixation mechanism comprises an adhesive patch which can be adhered to any portion of the second section, and wherein the distal end of the second section also comprises an adhesive patch which can be adhered to any portion of the first section.

9. The wristband of claim 7, wherein the fixation mechanism comprises a buckle, and wherein the second section comprises at least one opening configured to receive the buckle.

10. The wristband of claim 1, wherein the RFID inlay is embedded between two layers of the material.

11. The wristband of claim 1, wherein the flag portion comprises at least one printable region on at least one external surface of the flag portion.

12. The wristband of claim 11, wherein the flag portion comprises a fold line along the longitudinal axis from the hole to an end of the wristband that is opposite the strap portion, such that the flag portion may be folded in half along the fold line.

13. The wristband of claim 12, wherein a single external surface of the flag portion comprises two printable regions, and wherein each of the two printable regions is positioned on an opposite side of the fold line than the other of the two printable regions.

14. The wristband of claim 12, wherein a single external surface of the flag portion comprises a printable region on one side of the fold line and has a display on the opposite side of the fold line.

15. The wristband of claim 14, wherein the single external surface also has a fingerprint sensor on the same side of the fold line as the display, and wherein the fingerprint sensor is configured to sense and authenticate a fingerprint.

16. The wristband of claim 15, wherein the display is configured to indicate a result of an attempt to authenticate a fingerprint sensed by the fingerprint sensor.

17. The wristband of claim 11, wherein the display is configured to display information related to a wearer of the wristband.

18. The wristband of claim 17, wherein the information comprises medical information.

19. A spool of wristbands comprising:
a plurality of wristbands wound around a cylindrical core, wherein each wristband comprises flexible material formed into
a flag portion that comprises a radio-frequency identification (RFID) inlay embedded within the material, and
a strap portion extending from the flag portion, wherein the strap portion is perforated in a line along a longitudinal axis of the wristband from a distal end of the strap portion that is distal to the flag portion to a hole at a proximal end of the strap portion that is proximal to the flag portion, such that the strap portion may be torn, from the distal end to the hole at the proximal end along the longitudinal perforated line, into two sections of equal dimension, which each extend from the flag portion,
wherein each of the plurality of wristbands is joined to at least one adjacent wristband by the material, and
wherein the material is perforated, in a line along a lateral axis that is perpendicular to the longitudinal axis, at a boundary between each adjacent wristband, such that each wristband may be torn from each adjacent wristband along the lateral perforated line at the boundary between each wristband and each adjacent wristband.

20. A method of manufacturing a spool of wristbands comprising:
embedding an RFID inlay within a material at a plurality of fixed spatial intervals;
perforating the material in a longitudinal line, along a longitudinal axis of the material, at a plurality of fixed spatial intervals, to define two separable sections of equal dimension;
punching a hole in the material at one end of each longitudinal line;
perforating the material in a lateral line, along a lateral axis of the material that is perpendicular to the longitudinal axis, at a plurality of fixed spatial intervals, to define separable boundaries between the wristbands; and
spooling the material around a cylindrical core.

* * * * *